US009628299B2

(12) United States Patent
Uppu et al.

(10) Patent No.: US 9,628,299 B2
(45) Date of Patent: Apr. 18, 2017

(54) METHOD AND SYSTEM FOR DATA TRANSFER BETWEEN COMPUTE CLUSTERS AND FILE SYSTEM

(71) Applicant: DATADIRECT NETWORKS, INC., Chatsworth, CA (US)

(72) Inventors: Pavan Kumar Uppu, Laurel, MD (US); Jason Micah Cope, Highland, MD (US); Paul Nowoczynski, Brooklyn, NY (US); Michael Piszczek, Laurel, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 579 days.

(21) Appl. No.: 14/045,170

(22) Filed: Oct. 3, 2013

(65) Prior Publication Data
US 2014/0351300 A1 Nov. 27, 2014

Related U.S. Application Data

(60) Provisional application No. 61/827,199, filed on May 24, 2013.

(51) Int. Cl.
*G06F 13/28* (2006.01)
*G06F 12/0866* (2016.01)
*H04L 12/64* (2006.01)

(52) U.S. Cl.
CPC ................ *H04L 12/6418* (2013.01)

(58) Field of Classification Search
CPC ........... G06F 17/30194; G06F 12/0246; G06F 13/28; G06F 15/17331; G06F 12/0866; G06F 17/30091

(Continued)

(56) References Cited

U.S. PATENT DOCUMENTS 8,868,576 B1 * 10/2014 Faibish ............... G06F 17/3056
707/755
8,972,465 B1 * 3/2015 Faibish ............ G06F 17/30091
707/822

(Continued)

OTHER PUBLICATIONS

Ning Liu, Jaon Cope, Philip Carns, Christopher Carothers, Robert Ross, Gary Grider, Adam Crume, Carlos Maltzahn, "On the Role of Burst Buffers in Leadership-Class Stoage Systems", Apr. 16-20, 2012, Mass Storage Systems and Technologies (MSST), 2012 IEEE 28th Symposium, pp. 1-11.*

(Continued)

*Primary Examiner* — Mohammad S Rostami
*Assistant Examiner* — Robert F May
(74) *Attorney, Agent, or Firm* — Rosenberg, Klein & Lee

(57) ABSTRACT

A data migrating system and method are provided in which a Burst Buffer Network Aggregator (BBNA) process is configured either on the File Servers or on the File System's dedicated I/O nodes to coalesce data fragments stored in participating Burst Buffer nodes under the direction of a primary BB node appointed by a data generating entity prior to transfer of the full data stripe into the File System. The "write" request in the form of a full data stripe is distributed into a plurality of data fragments among participating BB nodes along with corresponding metadata. The primary BB node gathers the metadata from the participating BB nodes, sends the metadata list to the BBNA unit, responsive to which the BBNA unit allocates a buffer sufficient to store the full data stripe, and transfers data fragments from participating BB nodes into the full data stripe buffer, thereby coalescing the data fragments into the full data stripe, which is subsequently transferred from the buffer in the BBNA unit into the File System.

19 Claims, 11 Drawing Sheets

(58) Field of Classification Search
USPC .................................. 707/827, 822, 823, 609
See application file for complete search history.

(56) References Cited

U.S. PATENT DOCUMENTS

| | | | | |
|---|---|---|---|---|
| 2005/0097259 | A1* | 5/2005 | Zievers | G06F 12/0802 |
| | | | | 711/100 |
| 2009/0228633 | A1* | 9/2009 | Horishima | G06F 13/28 |
| | | | | 711/103 |
| 2012/0155256 | A1* | 6/2012 | Pope | G06F 13/128 |
| | | | | 370/230 |
| 2012/0254485 | A1* | 10/2012 | Tamura | G06F 9/544 |
| | | | | 710/56 |

OTHER PUBLICATIONS

Ning Liu, Jaon Cope, Philip Cams, Christopher Carothers, Robert Ross, Gary Grider, Adam Crume, Carlos Maltzahn, "On the Role of Burst Buffers in Leadership-Class Stoage Systems", Apr. 16-20, 2012, Mass Storage Systems and Technologies (MSST), 2012 IEEE 28th Symposium, pp. 1-11.*

* cited by examiner

METHOD AND SYSTEM FOR DATA TRANSFER BETWEEN COMPUTE CLUSTERS AND FILE SYSTEM

REFERENCE TO RELATED APPLICATIONS

This Utility patent application is based on the Provisional Patent Application No. 61/827,199 filed on 24 May 2013.

FIELD OF THE INVENTION

The present method and system is directed to data migration between high performance computing cluster architectures (also referred to herein as data generating entities) and a data storage structure. In particular the method and system relates to migration of applications' checkpoint results between high performance compute clusters and a HDD (Hard Disk Drive)—based parallel File System.

More in particular, the present invention relates to a data migration system performing an expedited checkpoint activity and employing Burst Buffer (BB) tier intercoupled between data generating entities and the parallel File System to store data in the BB tier prior to writing the data to the File System.

In overall concept, the present system and method is directed to storing checkpoint results in a parallel File System using a Burst Buffer tier which stores the application checkpoint data which is further transferred to the parallel File System in an efficient manner where the coalescing duties for the data fragmented among the burst buffers are assigned to the File System, i.e., to a Burst Buffer Network Aggregator process which may reside either on File Servers or on I/O node dedicated for interaction with the File System.

BACKGROUND OF THE INVENTION

Computer clusters, or groups of linked computers, have been widely used to improve performance over that provided by a single computer, especially in extended computations, for example, involving simulations of complex physical phenomena. Conventionally, as shown in FIG. 1, in a computer cluster 10, compute nodes (also referred to herein as client nodes) 12 are linked by a High Speed Network (HSN) 14 which permits the sharing of the computers resources and memory.

Data transfers to and/or from the compute nodes are performed through the High Speed Network 14 and are managed by additional computer structure, also referred to as a File System 16. The File System includes File Servers 18 which file data from multiple compute nodes and assign a unique location for each compute node in the overall File System.

Typically, data migrate from the File Servers 18 to be stored in a data Storage Network 20, such as, for example, hard disk drives (HDD) (or Flash Memory) 22 arranged in storage devices arrays.

In a high performance compute cluster, applications periodically checkpoint the computed results of their simulations. Checkpointing is a technique for inserting fault tolerance into computing system. It basically includes the operation of storing a "snapshot" of the current application state, and subsequently using it for restarting the application execution in case of hardware failures which may cause the application to crash. These checkpoint results are generally stored into an HDD-based parallel file system 16 which is written to by many or all of an application's threads.

The compute cluster may assume either the compute state (or compute cycle) or the input/output (I/O) state (or I/O cycle), which are typically mutually exclusive. The process of checkpointing and moving data is carried out during the I/O cycle of the compute nodes, e.g., the data transfers are executed during time intervals when the computer activity has ceased. Since during the I/O cycle no actual computations occur, it is important to keep the I/O cycle as short as possible to maximize the overall computer duty cycle of the compute cluster.

In large compute clusters, the number of threads may approach millions, and in the coming years, application thread count will increase significantly. The thread count of large parallel applications increases proportionally to the core counts of today's microprocessors, where the trend over the last several years has been an increase in cores over increases in processor clock speed. The trend of increasing core counts will continue into the near future guaranteeing that large compute cluster applications will also become increasingly parallel.

As shown in FIG. 1, the applications issue "write" requests which are forwarded to I/O nodes 24 through the HSN 14. The I/O nodes 24 delay the "write" requests to the file system servers 18. All the data that needs to be written is copied in the I/O nodes 24 before the File System's "write" request is issued from CN (computer network) to the memory in the I/O nodes.

In servicing the file system "write" request, the data is copied to File System (FS) buffer 26 before being written to the storage devices 22 in the data storage network 20.

High degrees of application parallelism create challenges for the parallel file systems which are responsible for storing the applications' checkpoint output. This is largely due to the stringent coherency protocols and data layout policies employed by parallel file systems. These phenomena create hurdles for large applications which seek to store their output quickly and efficiently.

It is common for applications to store checkpoint data at a mere fraction of the parallel File System's peak performance. Unfortunately, it is uncommon for applications to actually achieve this peak. The primary culprits are serialization due to enforcement of coherency protocols and static file layouts which prevent dynamic load balancing. In the latter case, an application only stores as fast as is permitted by the slowest unit of storage in the parallel File System.

Since these prohibitive aspects of parallel File Systems limit the system's ability to scale horizontally (i.e. by adding more storage components to achieve increased throughput), new methods for storing checkpoint data have been developed to service the next generation of high performance compute clusters.

These new methods use a multi-fold approach aimed at dealing with the deficiencies of current parallel file system implementations, as well as incorporating a faster tier 28 of storage hardware. The new tier 28 of storage hardware shown in FIG. 2 is based on Non-Volatile Memory (NVM) technology which is positioned between the HDD-based parallel File System 16 and the application running on compute cluster 10. The tier 28 is called a "Burst Buffer tier," also referred to herein as BB tier.

As shown in FIG. 2, in this implementation, the I/O nodes 24 are augmented with Burst Buffers 29 which form the BB tier 28. In this system, the applications checkpoint their state to the Burst Buffers 29 and resume computational activity once their output has been made durable in the Burst Buffer. The Burst Buffer tier's input performance is at least one order of magnitude faster than that of the HDD-based parallel File System 16. This increase in speed allows applications to complete their checkpoint activity in an expedited manner.

When an application issues "write" request with the intent of "pushing" the data to the BB tier 28, the "write" request at the Burst Buffer tier 28 will be directed to an algorithmically determined BB node. The data is written to NVRAM where the request is received, while the corresponding metadata are forwarded to the identified BB node, also referred to herein as a primary node.

At a later time, when the data residing in the BB node is to be forwarded to the File System 16, the metadata in the primary BB node will construct a File System data stripe from data fragments which possibly reside in multiple participating BB nodes. Once a buffer with the file system stripe data is ready at the primary BB node, it issues a File System (FS) "write" request, and a full data stripe is copied to the FS buffer 26 before being written to the data storage network 20.

However, this performance technique requires additional data management activities. The checkpoint data resident in a Burst Buffer (or some portion thereof) must be moved into the parallel File System at some point to make room for the next set of checkpoints. Furthermore, this movement must occur in an efficient manner, to minimize the impact of the parallel File System's innate inefficiencies.

Migrating data from the Burst Buffer tier 28 to the parallel File System 16 may be further complicated by hardware topology of the compute cluster 10. In many cases the individual compute servers utilize specific blade technologies aimed at improving density, cooling, and cabling efficiency. This may cause form factor limitations which limit the hardware configuration of an I/O node with a cluster server responsible for burst buffer or parallel file system activity.

For instance, an I/O node 24 may have a limited number of PCIe adapter slots which may be dedicated to either NVM cards or host-bus adapters (HBA) used to access the storage network 20 where the parallel File System 16 resides.

Further complicating the issue is the bandwidth differential between the Burst Buffer tier 28 and the parallel File System 16. In many situations, especially when the I/O node operates in view of the prescribed ratio of NVM bandwidth to storage network bandwidth, the performance differential may be improperly embodied within a single I/O node.

Even in cases where a cluster server may be designed as such, the number of links to the storage network 20 will far exceed the number necessary to saturate the bandwidth of the parallel File System, thus further increasing the impracticality of the approach.

To deal with these issues, the system's I/O nodes 24 may be divided into two groups, i.e., a burst buffer group 30 (or BBIO group) and parallel File System gateway group 32 (or PFSIO group), as shown in FIG. 3. By establishing two I/O node groups, system architects may tailor the system to meet the bandwidth demands of both the Burst Buffer tier and parallel File System without requiring unnecessary storage network hardware.

Compute cluster systems which utilize the I/O grouping strategy shown in FIG. 3, may however experience a new challenge, i.e., the efficient movement of data between the Burst Buffer I/O nodes (BBIO) 30 and the parallel File System gateway I/O nodes (PFSIO) 32.

When staging data from the BBIO 30 to the PFSIO 32, the staging process assigns an evenly divided percentage of BBIO nodes to each PFSIO node, and data fragments are directed as such. Unfortunately, this approach is prohibitive since it does not ensure that I/O to the parallel File System is formatted in a manner which will attain a high percentage of the parallel File System's peak bandwidth. One of the advantages of the Burst Buffer tier is to provide input which has been groomed in a manner germane to the parallel File System. Typically, this means coalescing data fragments which are logically adjacent in a file's address space. Coalesced buffers are aligned to the parallel File System's full data stripe size which is typically on the order of one to several Megabytes.

Due to the characteristics of the NVM, the BB tier is well suited to this task. In order to properly incorporate the PFSIO layer 32, coalescing of file fragments must be taken into account as data is moved from the BBIO nodes 30 to the PFSIO nodes 32.

As shown in FIGS. 4A and 4B, the full data stripe 34 received from the application, includes client data fragments 36, 38 and 40 which are distributed among BB nodes in a deterministic way beneficial for load balancing.

Under the assumption that the FS full data stripe 34 is distributed to the BBIOs, i.e., $BB_0$, $BB_1$ and $BB_2$, and assuming the $BB_0$ node is assigned the function of a primary BB node for the FS full data stripe "write" request 34, the $BB_0$ node will allocate a full data stripe sized buffer 42 and initiate "read" requests to the participating BB nodes, i.e., $BB_1$ and $BB_2$, that hold the fragments 38 and 40, respectively, which make up the full data stripe 34. The data is transferred to the buffer 42.

Subsequently, the $BB_0$ node will issue a File System "write" request. Since the File System server requires the data in its buffer before it is stored in the data storage network, the data stripe 34 is copied from the $BB_0$ buffer 42 to the FS buffer prior to transfer to the File System.

However, this method causes overly extensive network traffic when data in the Burst Buffer tier is highly fragmented amongst the BBIO nodes. Also, an additional network transfer is required when the full data stripe size buffer 42 is moved between the BBIO and PFSIO sections.

Therefore, it would be highly desirable to provide a system where superfluous transfers could be avoided, and where the data migration is performed in a highly efficient manner.

SUMMARY OF THE INVENTION

It is therefore an object of the present invention to provide a method and system for efficient data migration between data generating entities and a File System.

It is another object of the present invention to provide a system and method for migrating the checkpoint results into a parallel File System in an efficient manner through the use of a tier of additional storage hardware (Burst Buffer tier) coupled between the running applications and the parallel File System, where applications checkpoint their state to the Burst Buffer tier and resume computational activity. The checkpoint data resident in the Burst Buffer tier can be moved into the parallel File System at some point independent of the application's performance cycle.

It is another object of the present invention to provide a method and system for data migration between compute nodes and a File System where the efficient movement of data between the Burst Buffer I/O nodes (BBIO) and the parallel File System gateway I/O nodes (PFSIO) is provided by assigning the data coalescing duties to the File System (specifically, either to the PFSIO nodes or the file servers) at the direction of the BBIO nodes.

It is an additional object of the present invention to provide a method and system for data migration between compute nodes and a parallel File System where fragments of data are stored in participating Burst Buffer I/O nodes, and where a primary Burst Buffer I/O node (assigned by an algorithm running on at least one compute node) gathers the extent information and metadata of the data fragments stored in other participating BB nodes into a metadata list, and provides a corresponding command (including the metadata list) to the BB Network Aggregator (BBNA). The BBNA process is configured either on the file servers or the File System's dedicated I/O nodes. Subsequent to receipt of the metadata list from the primary BBIO node, the BB Network Aggregator gathers the data fragments from various participating BB I/O nodes into a full data stripe buffer owned by the BBNA, in accordance with the command received from the primary BB node, and further transfers the full data stripe to the storage network associated with the File System.

It is still an object of the present invention to provide a method and system for data migration between compute nodes and a parallel File System where the I/O nodes are separated in two groups, i.e., a group of BB I/O (BBIO) nodes augmented with fast Burst Buffers, and another group of I/O nodes (PFSIO) which constitute the parallel File System's gateway group. This arrangement is advantageous in that it can meet the bandwidths demands of both the Burst Buffer tier and the parallel File System without requiring additional storage network hardware. The group of PFSIO nodes is provided with the BBNA process for coalescing the data fragments saved in the BBIO nodes.

In one aspect, the present concept is a method for data migration between data generating entities and the File System. The method comprises the following steps:

operatively coupling a Burst Buffer (BB) tier between at least one data generating entity and a File System. A plurality of BB nodes in the BB tier are adopted for performing with the input speed exceeding the input speed of the File System.

The subject method also includes the step of:

configuring the File System with at least one Burst Buffer Network Aggregator (BBNA) unit.

Upon sending a first data "write" request from a data generating entity to the BB tier, data fragments of the data are distributed among participating BB nodes, so that each data fragment and metadata associated therewith are stored in a respective participating BB node.

One BB node among the participating BB nodes is assigned the function of a primary BB node, i.e., it is delegated to gather metadata residing in the participating BB nodes, to create a metadata list, and to direct the BBNA process accordingly.

The primary BB node sends a second data "write" request along with the metadata list to the BBNA unit, which subsequently allocates a full data stripe buffer sufficient to store data required by the second data "write" request.

Subsequently, the data fragments from the participating BB nodes are transferred into the full data stripe buffer allocated by the BBNA in accordance with the metadata list generated by the primary BB node. Thus, coalescing of the data fragments into a full data stripe is performed by the BBNA under direction of the primary BB node.

Subsequently, full data stripe is transferred from the full data stripe buffer of the BBNA unit into the File System, and the BBNA unit reports to the primary BB node on the results of the data filing.

The subject method may be performed either in a "BBNA Target" mode of operation or in a "BBNA Host" mode of operation.

In the "BBNA Target" mode, the BB nodes operate with the byte addressable buffers. In this mode, prior to the step of transferring the fragments from the participating BB nodes into the BSNA's allocated buffer, the BBNA issues remote memory "READ" request to read contents of the byte addressable buffers of the BB nodes.

In the "BBNA Host" mode, the BBNA issues a "READ" request to participating BB nodes. Responsive to the "READ" request, the BB nodes push data fragments residing thereat to the full data stripe buffer allocated at the BBNA unit.

The primary BB node creates a command including BB nodes ID, buffer descriptor, address, size, and a RDMA (Remote Direct Memory Access) key on the byte addressable buffers, as well as extent information required for the File System request.

The BBNA unit is a process which may be configured on File Servers, or, alternatively, on the I/O nodes dedicated for interacting with the File System.

The present concept further constitutes a method for data migration between data generating entities and the file system where the application issues a "read" request.

In servicing the "read" request, the subject method is performed by the sequence of steps:

operatively coupling a Burst Buffer (BB) tier between at least one data generating entity and a File System, and
providing a plurality of BB nodes in the BB tier operating with the input speed exceeding the input speed of the file system;
configuring the File System with at least one Burst Buffer Network Aggregator (BBNA) unit;
upon receipt of the "read" request from a data generating entity, allocating, by the BBNA unit, a full data stripe buffer sufficient to service the data "READ" request, and
issuing a "READ" request to the File System to read the requested data therefrom into the allocated full data stripe buffer.

Upon completion of the "READ" request by the File System, the method continues through issuing, by the BBNA unit, a Remote Memory "write" request, and
transferring the data from the allocated full data stripe buffer of the BBNA unit to a destination BB node in the BB tier.

In an additional aspect, the present invention represents a system for data migration between data generating entities and a File System, which includes:

a Burst Buffer (BB) tier operatively coupled between at least one data generating entirety and the File System, where the Burst Buffer tier includes a plurality of BB nodes having input speed higher than the input speed of the File System;
a plurality of File Servers of the File System operatively coupled to the BB tier; and
at least one Burst Buffer Network Aggregator (BBNA) unit (process) configured in the File System and operatively coupled to the plurality of BB nodes.

The BBNA process is configured to coalesce data fragments stored in participating BB nodes from the BB tier into a full data stripe prior to transfer the full data stripe into the File System under the direction of a primary BB node delegated for this purpose among the participating BB nodes.

The BBNA unit may reside on File Servers, or alternatively, at the I/O nodes dedicated for interacting with the File System.

The primary BB node assigned algorithmically by a data generating entity, is configured to gather metadata from participating BB nodes, and to generate a metadata list for data fragments residing in the participating BB nodes.

The BBNA unit is configured to allocate a full data stripe buffer sufficient to store the full stripe of the data fragments upon receipt of the metadata list from the primary BB node and to prompt the transfer of the data fragments from the participating BB nodes to the full data stripe buffer in the BBNA unit prior to transferring to the File System.

The system comprises an array of data storage units operatively coupled to the File Servers. The data on the File Servers are stored in the storage array.

If BB nodes are configured with a byte addressable buffer, then the BBNA unit reads contents of the byte addressable buffer.

The BBNA unit is also configured to participate in servicing data "read" requests. In this scenario, the BBNA unit is configured to:

allocate a buffer sufficient to service the "READ" request,
transfer the requested data from the File System to the buffer, and
subsequently, transfer the requested data to at least one destination BB node indicated by the primary BB node.

These and other objects of the present invention will be apparent in view of the specification taken in conjunction with the patent drawings.

DETAILED DESCRIPTION OF THE PREFERRED EMBODIMENTS

Figure 1:
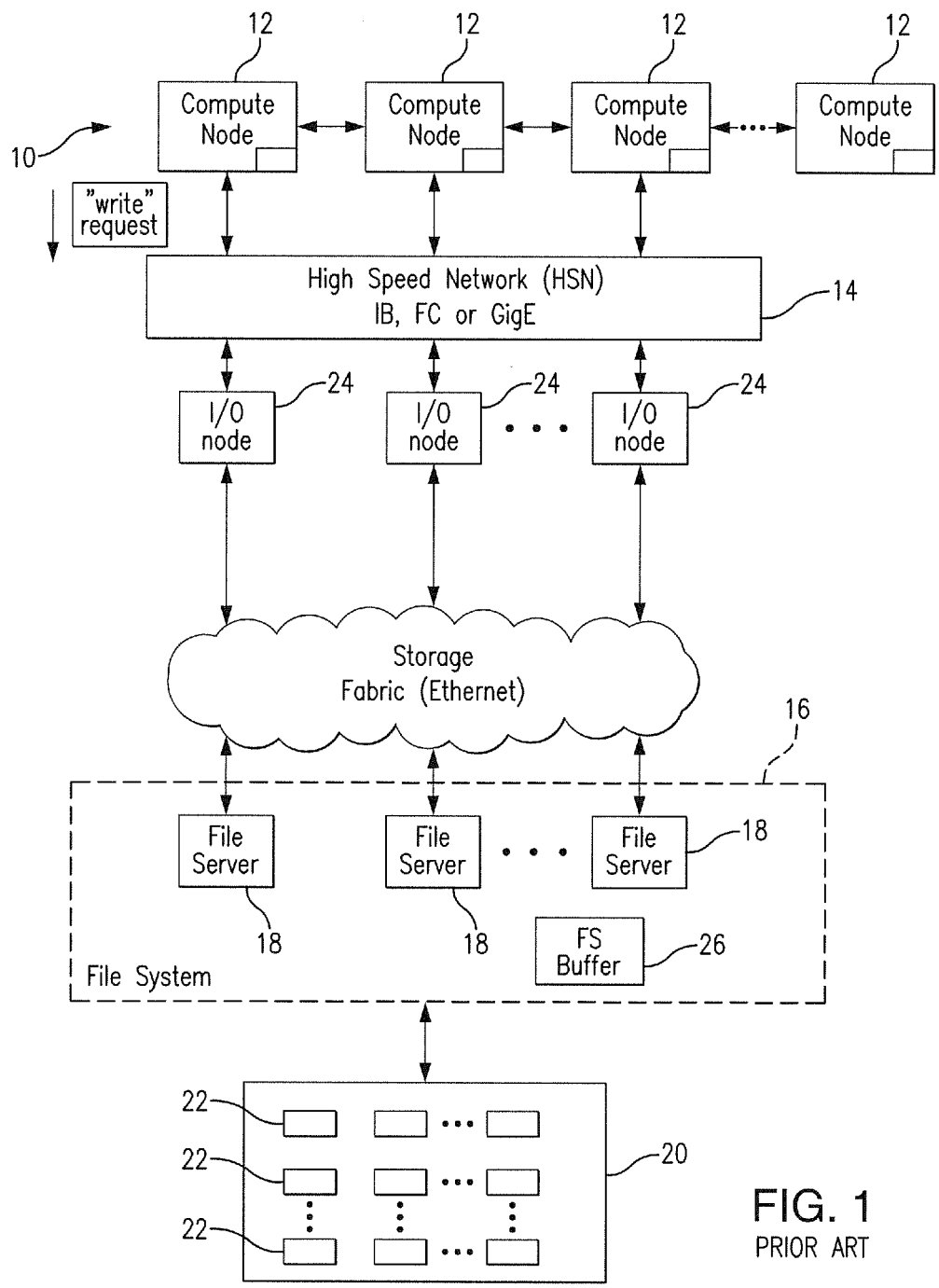
FIG. 1 is a schematic representation of a data migration system of the prior art.
Figure 2:
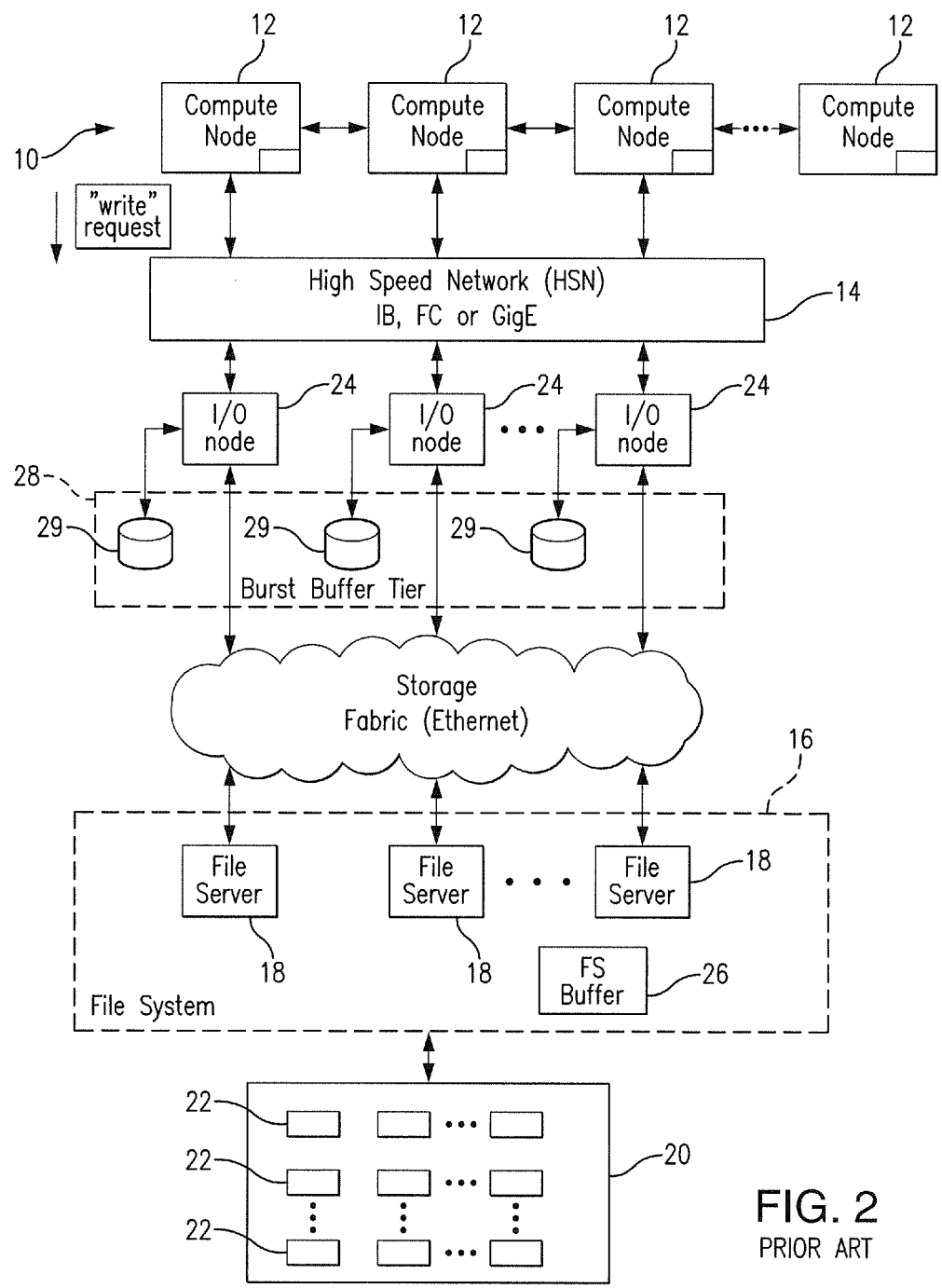
FIG. 2 is a schematic representation of an alternative data migration system of the prior art employing a Burst Buffer tier.
Figure 3:
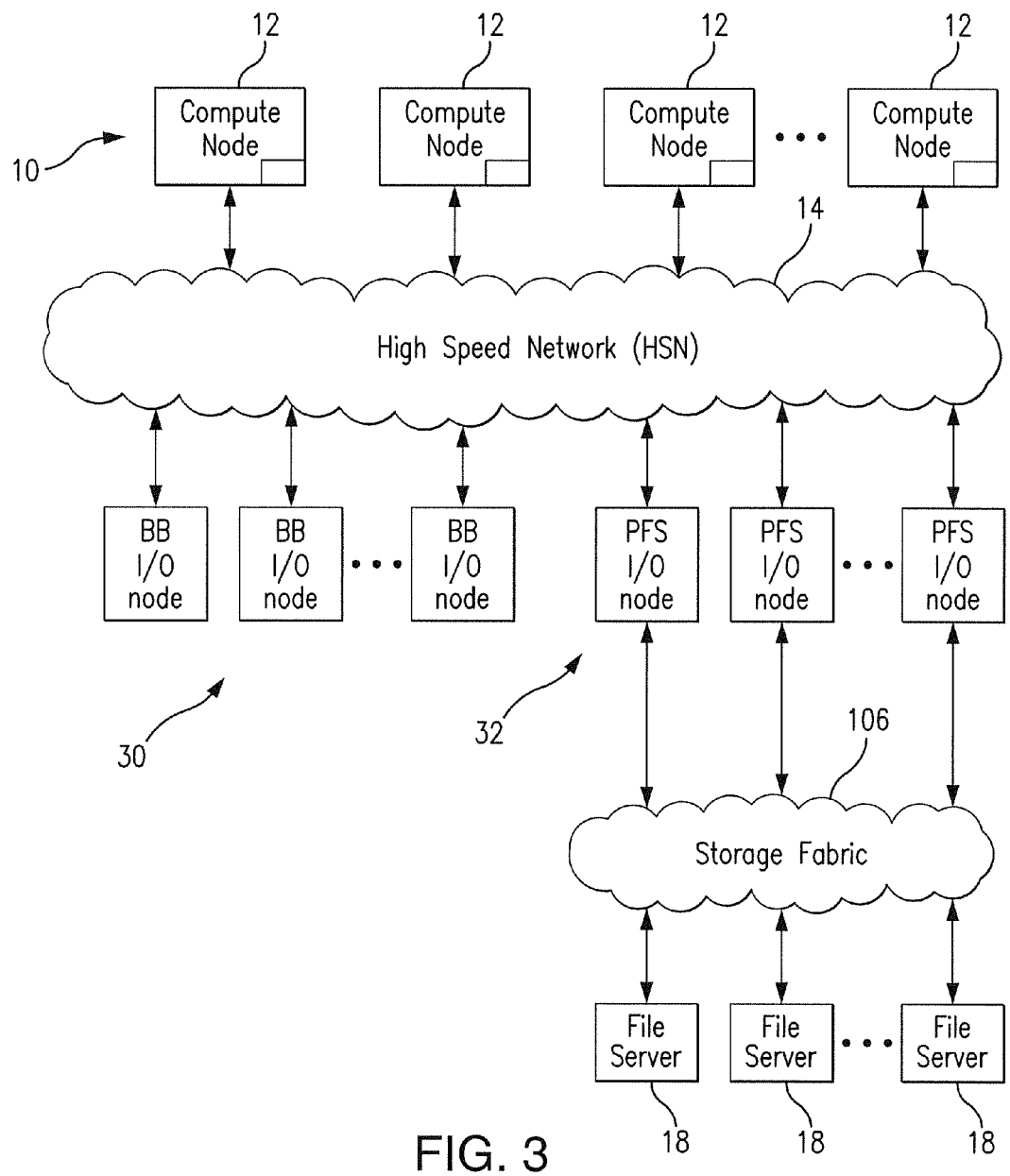
FIG. 3 is a schematic diagram of the system of the prior art with a group of I/O nodes augmented with burst buffers and another group of I/O nodes dedicated for interacting with the File System.
Figure 4A:
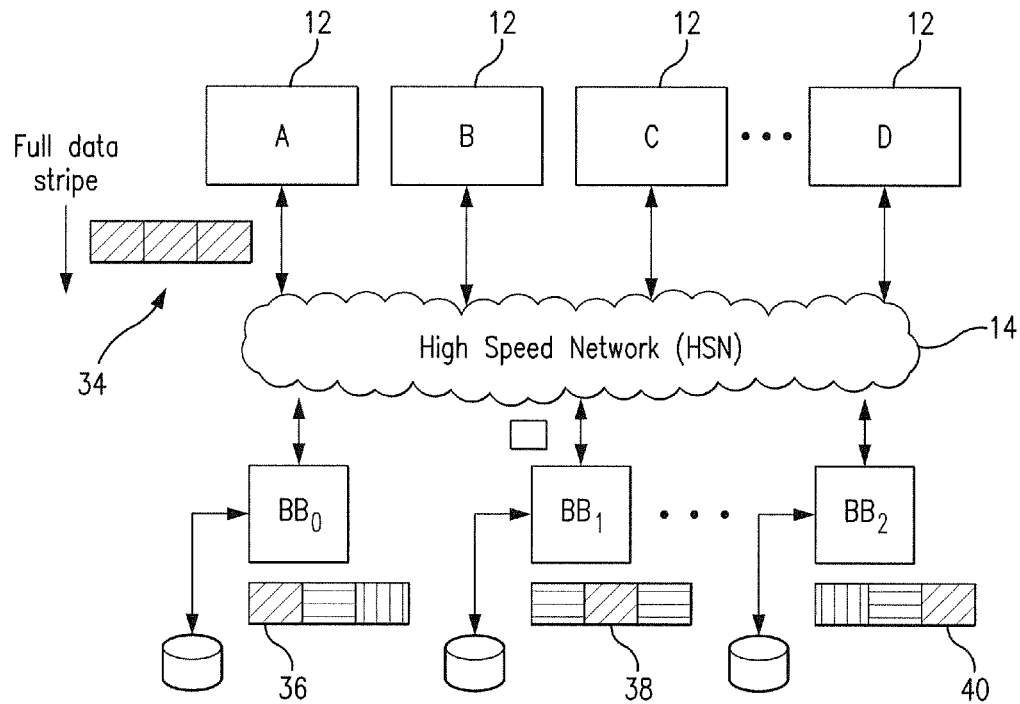
FIGS. 4A and 4B are schematic representations of the data migration scheme of prior art operated in data scattering and gathering regime.
Figure 4B:
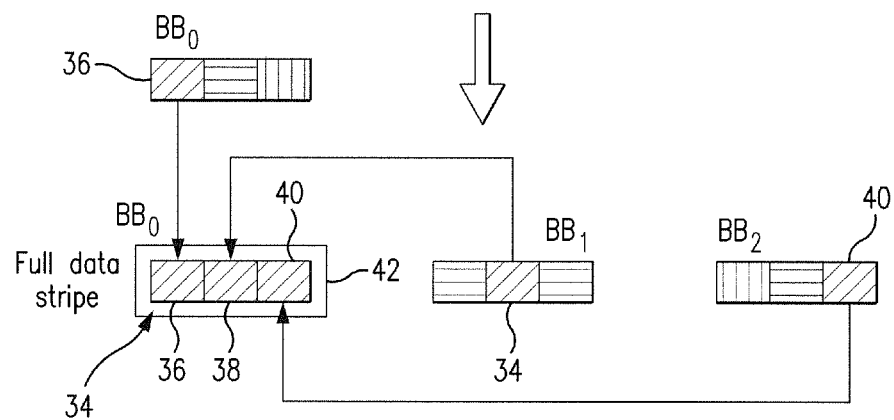
Figure 5:
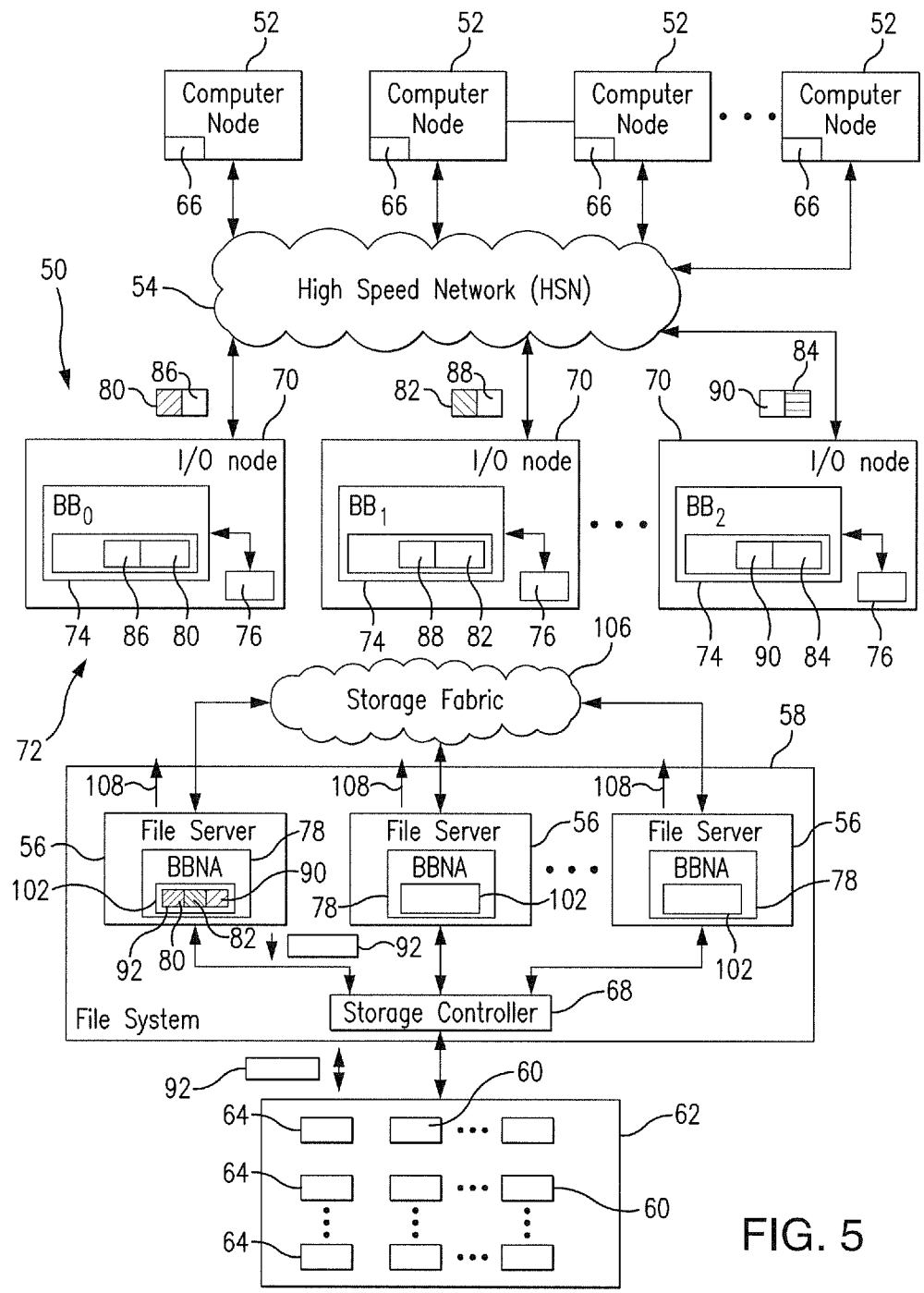
FIG. 5 is a system for data migration of the present investigation showing a Burst Buffer Network Aggregator process residing on File Servers.
Figure 6:
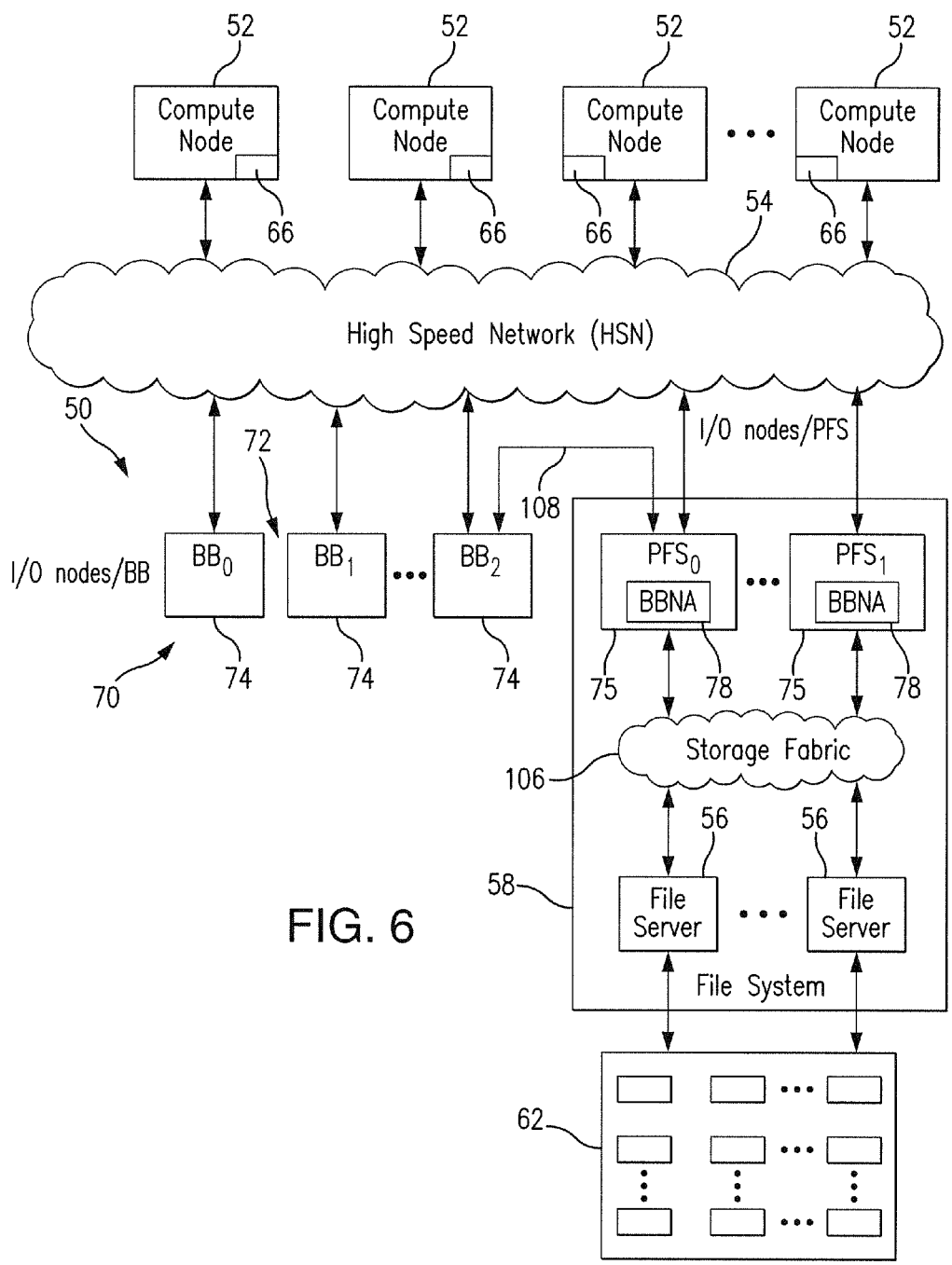
FIG. 6 is a data migration system of the present invention with the Burst Buffer Network Aggregator process residing on the parallel File System's dedicated I/O nodes.

Referring to FIGS. 5-6, the system 50 of the present invention includes a number of compute (or client) nodes 52. The compute nodes may be arranged in computing groups, or compute clusters, to perform complex computations of various types. The operation of the compute nodes depends on the system application. They may function as servers, super computing clusters, etc., and have the capacity to "write" by outputting data to, as well as "read" data from, an external memory or any other data storage device. In the present description, the above-presented devices will also be intermittently referenced further as data generating entities, or computing architectures.

The compute nodes 52 are connected through a high speed network 54 to File Servers 56 which manage data migration from and to the computer nodes 52. The ratio of the computer nodes 52 to the servers 56 may in some cases be in excess of a thousand.

During the Input/Output (I/O) cycle of the computer nodes' operation, the data may be transferred from the computer nodes' cache to the File Servers which may place data in the File System 58 for subsequent retrieval. The High Speed Network 54 functions as a high speed switch and may be based on any of the network transport protocols, such as, for example, Infiniband (IB), Fibre Channel (FC), and Gigabit Ethernet (GigE).

The subject system 50 is capable of handling any type of data transfer. However, for the sake of simplicity, and as an example, the following description of the system operation will be presented regarding the "checkpoint" data. The "checkpoint" data is data which is written into the program during the execution of a simulation, with the purpose of restoration of the simulation from the "checkpoint" in the event of the application software or hardware failure.

Data retrieved from compute nodes 52, and/or File Servers 56 are intended to be written into the File System 58, and stored on storage Disk Drives (or Flash Memory devices) 60 which may be arrayed in any format shown, for example, as storage disk array 62.

The storage disk array may be arranged, for example, in the RAID (Redundant Array of Independent Drives) format. The RAID storage system is a multi-dimensional array of disk drives (or flash memory devices) 60 distributed in Read/Write tier groups 64 for storing data D and parity values P corresponding to the data stored in the array. Each tier group 64 in the array 62 constitutes a multiplicity of data disk storage channels.

Each compute node 52 has a software unit 66 which controls the operation of the compute node for the intended purposes and allocates I/O cycles during the execution of the computer node process for the "checkpoint". The "checkpoint" process changes the status of the computer node from the computing mode into the I/O cycle when no actual computation takes place. Since the time of the I/O cycle allocated for the checkpoint is waste time from the overall duty cycle of the computer node, it is preferred that the I/O cycles be kept as short as possible in order to improve the computing duty cycle of the computer node.

Preferably, the disk drives 60 are spared from random operations, since in randomly granted access, the heads that record the data on the disks have to move over various sectors of the drive, thus taking a great deal of time (seeking time) compared to the actual write or read operation of the system.

A storage controller 68 controls the operation of the disks in the disk array 62. In the present system, the disk drives are accessed in an optimally sequential manner for the disk drives exploitation, or in another efficient manner providing the uncompromised I/O performance of a storage controller 68 of the storage disk array 62.

Disk drives are provided with the capability of receiving data in the most efficient manner so that the system 50 avoids the need for an excessive number of disk drives for storing the "checkpoint" data. Thus, the disks which do not participate in data transfer, may stay deactivated, as controlled by the storage controller 68 for the period they are not accessed. This avoids excessive power consumption of the storage disk arrays.

Interconnected between the HSN 54 and the File Servers 56, are Input/Output (I/O) nodes 70 which serve as interface and render communication between the Compute Nodes 52, HSN 54, and the File Servers 56 using different data transfer protocols (IB, FC, GigE), as needed by the system. I/O nodes 70 are adapted for interfacing with the File Servers 56, as well as the File System 58 in its entirety.

The capability of storing the data in an expedited and efficient manner is provided by utilizing a tier of storage hardware, also referred to herein as a Burst Buffer (BB) tier 72.

The BB tier 72 is based on non-volatile memory (NVM) technology which is positioned between the compute nodes and the File System 58. The BB tier 72 includes a number of BB units 74. Each BB unit 74 augments a respective I/O node 70 in operative coupling to an I/O Forwarding Software 76 in the I/O nodes 70.

The applications running on compute nodes checkpoint their state to the Burst Buffer tier 72 instead of writing the checkpoint data directly into the File System. Once the checkpoint has been written durably in the Burst Buffer tier, the application can resume computational activity. The input performance of the Burst Buffers 74 is at least one order of magnitude faster than the input activity of HDD-based parallel File System 58. Thus, the increase in I/O speed permits applications to complete their checkpoint activity in an expedited fashion.

The checkpoint data resident in the Burst Buffer tier 72 are moved into the parallel File System 58 at some point to make room for the next set of checkpoints to transfer to the Burst Buffer. The specifics of the design of the present system 50 provides that the data movement from the BB tier 72 into the File System 58 occurs in a highly efficient manner while servicing "write" requests. Similarly, when servicing "read" requests, data migrate from the File System 58 into the requesting compute node(s) 52 in an efficient manner due to the usage of the BB tier 72 and the unique Data Aggregation Mechanism underlying the subject data migration process.

The present system 50 is provided with a mechanism in which a software based unit, further referred to herein as Burst Buffer Network Aggregator (further referenced herein as BBNA) 78 runs either on File Servers 56, as shown in FIG. 5, or on PFSIO (Parallel File System I/O) nodes, as shown in FIG. 6.

In FIG. 6, the I/O nodes 70 are separated in two groups including BB I/O (BBIO) nodes 74 and parallel File System I/O (PFSIO) nodes 75 dedicated for interaction with the File System 58. In this configuration, the BBNA process is a part of the I/O nodes that host the FS clients.

The PFS I/O nodes 75 communicate with FS servers 56 through the Storage Fabric 106, for example Ethernet. In FIG. 5 the Storage Fabric 106 is interposed between the BB I/O nodes 74 and the File Servers 56.

The BBNA unit 78 is configured to coalesce the data fragments that are germane to the parallel File System 58, as will be described in detail in following paragraphs.

As shown in FIGS. 5 and 6, when the data generating entity (entities) 52 generate(s) "write" request(s), the client data fragments 80, 82, . . . , 84, are distributed among the BB nodes 70 participating in the process in a deterministic way beneficial for load balancing.

Figure 7:
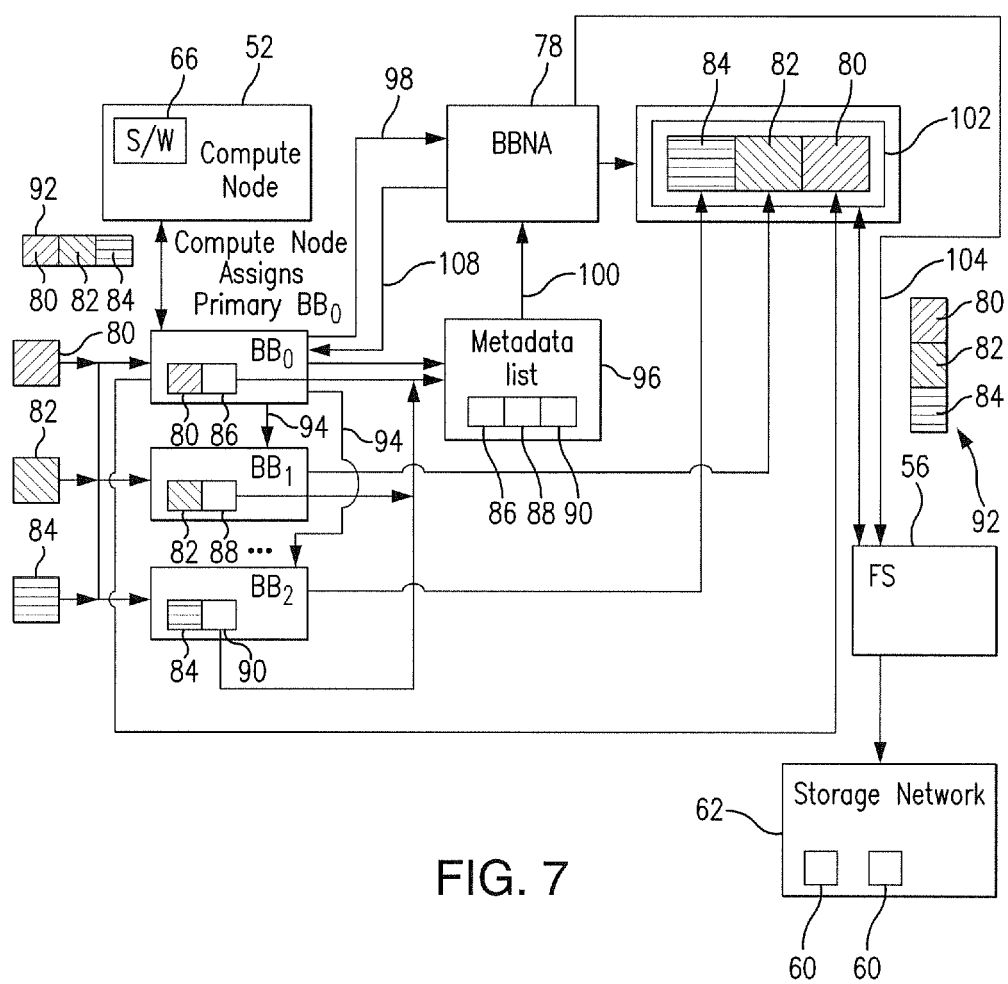
FIG. 7 is a schematic representation of the data migration process of the present system and method.

Assuming the data fragments 80, 82, . . . , 84 have been distributed to the Burst Buffer nodes $BB_0$, $BB_1$, . . . , $BB_2$, as shown in FIGS. 5, 6, and 7, along with the metadata 86, 88, . . . , 90 corresponding to the data fragments 80, 82, . . . , 84, respectively, which are also written in the BB nodes $BB_0$, $BB_1$, . . . , $BB_2$.

The algorithm 66 residing on the client compute nodes 52 assigns one of the participating BB nodes 74 to serve as a primary BB node for a particular full data stripe 92. For example, the $BB_0$, is assigned a function of the primary BB node.

As shown in FIG. 7, when the full data stripe 92 has to be flushed to the File System 58, the primary BB node ($BB_0$) assigned for the particular full data stripe data 92, sends a command 94 to the participating BB nodes ($BB_1$, . . . , $BB_2$) holding the data fragments 82, . . . , 84 to prepare data.

In this scenario, the primary node $BB_0$ does not allocate a full data stripe buffer, and does not copy the data fragments from the participating nodes $BB_1$ and $BB_2$ to any buffer at $BB_0$. Instead, the primary node $BB_0$ creates a list 96 of metadata corresponding to the fragments 80, 82, 84.

In addition, the primary node $BB_0$ sends a request 98 to the BBNA unit 78 configured either on the File Server 56 or residing at the I/O node dedicated for FS interaction.

Upon receipt of the request 98 from the primary node $BB_0$ and a command 100 containing the metadata list 96, the BBNA process 78 allocates a full data stripe buffer 102 and transfers the fragments 80, 82, 84 from the BB nodes $BB_0$, $BB_1$, $BB_2$, holding the subject fragments to the full data stripe buffer 102. Subsequently, the BBNA process 78 issues a File System "write" request 104 and transfers the full data stripe 92 thereto.

As presented, in the subject data migrating model, the data is copied only once from the respective source BB node to the BBNA buffer, thus eliminating the unwanted copying processes of fragments from the BB node participant nodes to the primary BB node prior to transferring the full stripe data to the FS buffer.

In the present scheme, the BB Network Aggregator 78 gathers all the data from various participating BB nodes into the full data stripe buffer 102 owned by the aggregator 78 in accordance with the information provided in the command 100 and the metadata list 96. The BB Network Aggregator 78 coalesces data fragments 80, 82, . . . , 84 which are logically adjacent in a file's address space. Coalesced buffers are aligned to the parallel File System's stripe size which is typically on the order of one to several megabytes.

The BB Network Aggregator 78 may perform the data gathering operation in two different ways. When the data 80, 82, 84 that need to be aggregated resides in byte addressable memory on the BB nodes $BB_0$, $BB_1$, $BB_2$, the BBNA process 78 issues remote memory "read" requests over the network 106 (in FIG. 5) or the HSN 54 (in FIG. 6) to read the participating BB buffers. This mode of operation is called the "BBNA Target" Mode.

Another mode of operation which is the "BBNA Host" Mode of operation, assumes the BB units are not byte addressable. In the "BBNA Host" Mode, the BBNA unit 78 issues a "read" request to the appropriate BB node which then directs the data to BBNA owned buffers 102 over the network.

The "BBNA Target" Mode of operation is useful in cases where the data that is required to be coalesced resides in byte addressable memory on the BB I/O nodes, and needs no intervention from CPUs on those nodes to read or write the data.

Figure 8:
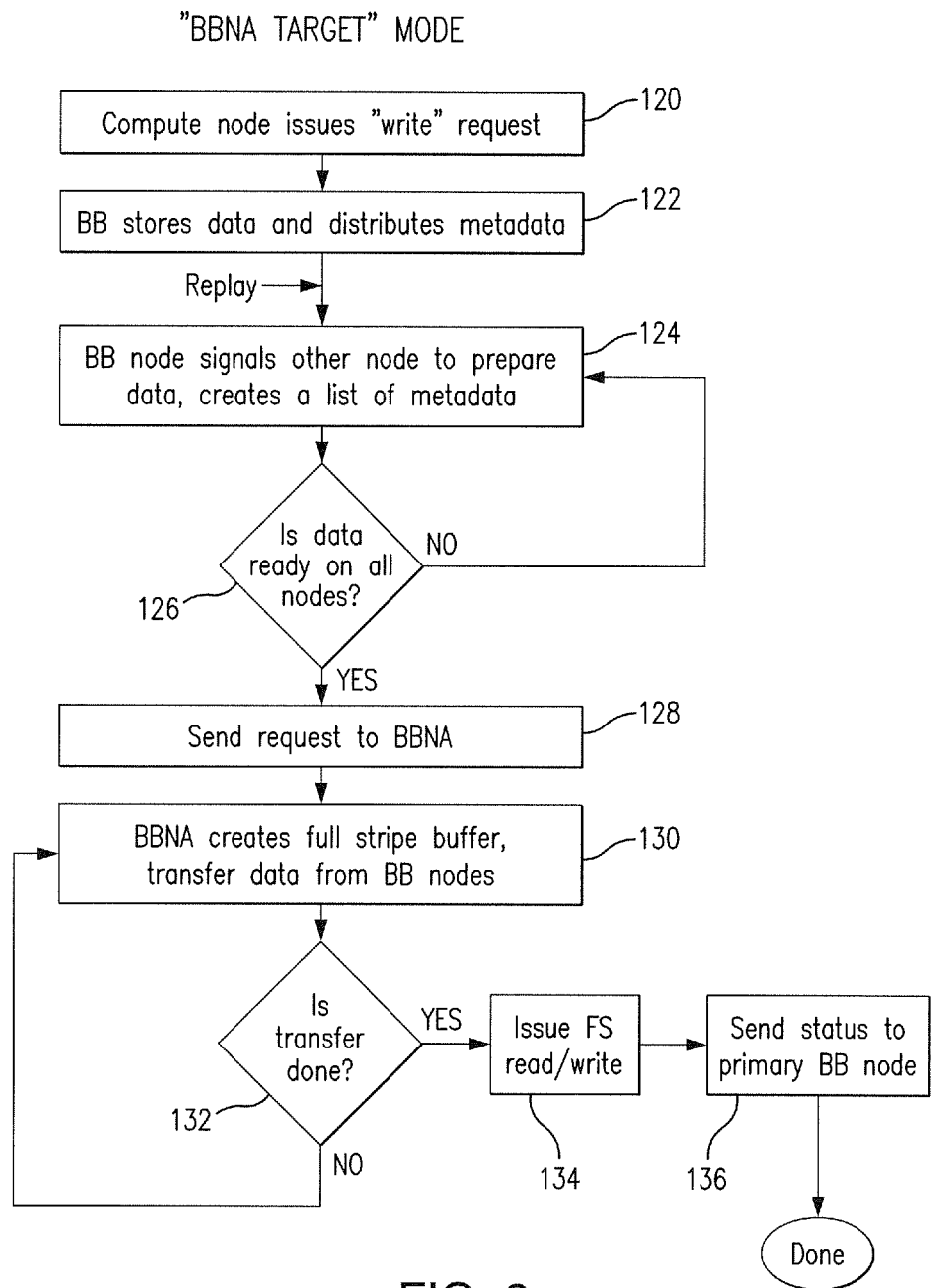
FIG. 8 is a flow chart diagram reflecting the operation of the subject system in the "BBNA Target" Mode of operation.

As presented in FIG. 8, reflecting the flow chart diagram of the "BBNA Target" Mode, the process is initiated in block 120 where the compute nodes issue a "write" request. In the next step 122, the BB tier stores data (in the form of data fragments, as well as the metadata) distributed among the participating BB units.

In this mechanism, the primary BB node responsible for issuing the File System I/O request, in step 124 gathers all the information required for the I/O request.

Also in step 124, the primary BB node signals all the hosting BB nodes to move their data to byte addressable buffers if not already in such buffers. The primary BB node gathers information about the byte addressable buffers, and creates a command consisting of the scattered buffers information, including BB node ID, the buffer descriptor which consists of an address, size and a key if RDMA capable, and the extent information required for file system request.

From step 124, the flow chart passes to logic block 126, where the primary BB node asks whether the participating hosting BB nodes if data fragments are ready on all nodes. If data are not ready, the process returns to step 124 and prompts the hosting BB nodes to prepare data.

If however in step 126, the primary BB node determines that data fragments are ready in all nodes, the primary BB node, in step 128, sends a request to the BBNA process which may run either on an edge I/O node dedicated to the FS interface, or on a file system server.

Upon receiving the request from the BB nodes, if the request is a "write" request, the BBNA process in step 130 allocates a full data stripe buffer which would be sufficient to hold all the data required for servicing the "write" request issued by the data generating entity, and subsequently issues a remote memory "read" request to transfer the data from the participating BB nodes to the BBNA's full data stripe buffer at appropriate offsets adjusted to the extent information in the command received from the primary BB node.

Further, the flow passes to logic block 132 where a determination is made in the transfer of the data fragments from participating BB nodes into the BBNA's full data stripe buffer has been completed. If the process is not completed, the flow chart loops to step 130 to prompt the transfer data from the BB nodes.

If however in step 132, the logic determines that the full transfer has been completed, the logic flows to block 134 where the BBNA issues a "write" I/O request to the File System to complete the operation.

Subsequently, the BBNA sends a feed-back response to the primary BB node in block 136, upon which the "BBNA Target" Mode operation is successfully completed.

If the subject system services a "read" request issued by the data generating entity, the BBNA allocates appropriate buffers sufficient to hold the data and issues a "read" request to the File System.

Upon the File System completing the request, the BBNA process issues remote memory "write" to push the read data to destination BB nodes which were indicated in the "read" command from the primary BB node. After the data is placed in appropriate BB nodes, the BBNA replies to the primary BB node which then indicates to all the participating BB nodes to move the data to NVRAM if required.

Figure 9A:
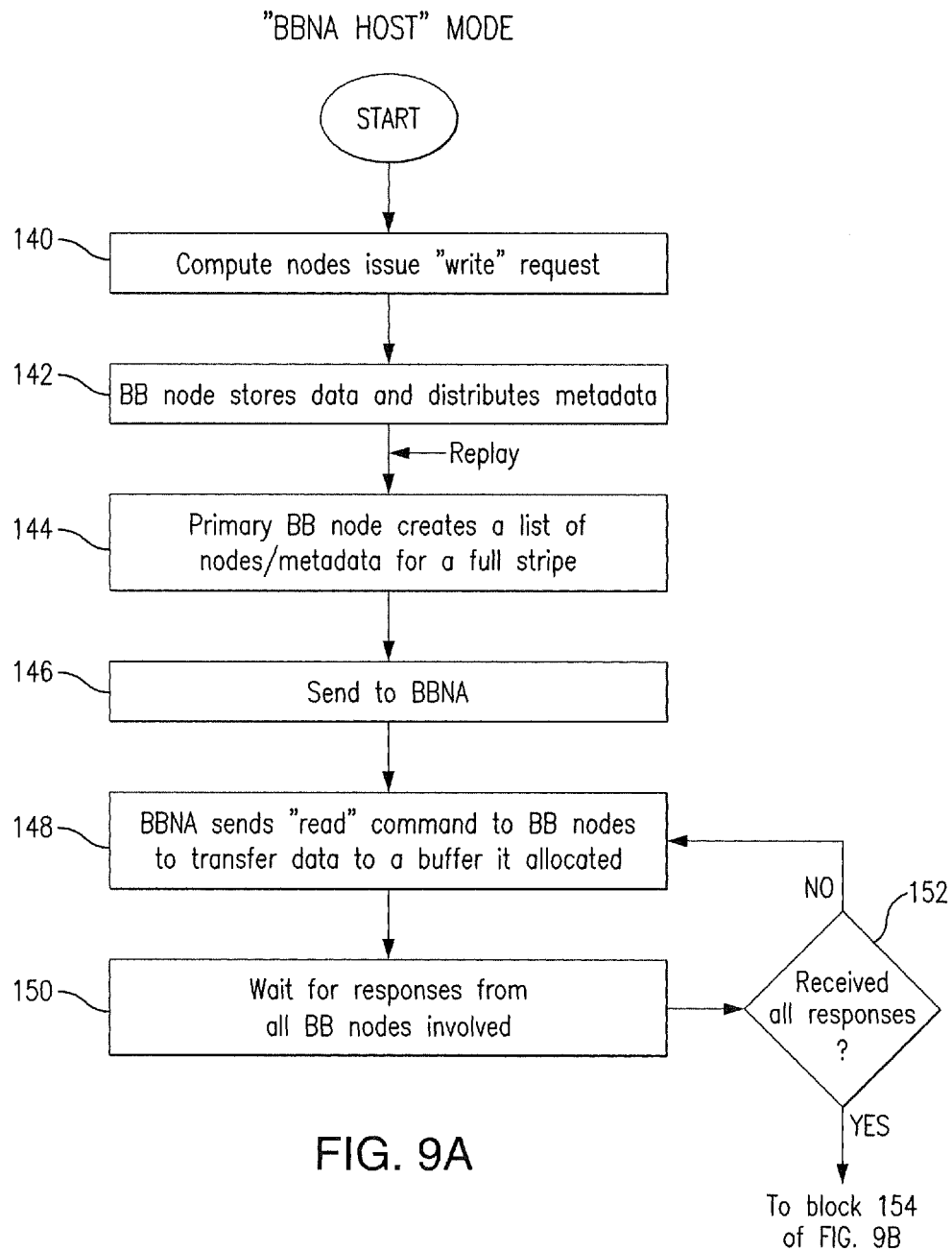
FIG. 9A-9B represent a flow chart diagram reflecting the operation of the subject system in the "BBNA Host" Mode of operation.
Figure 9B:
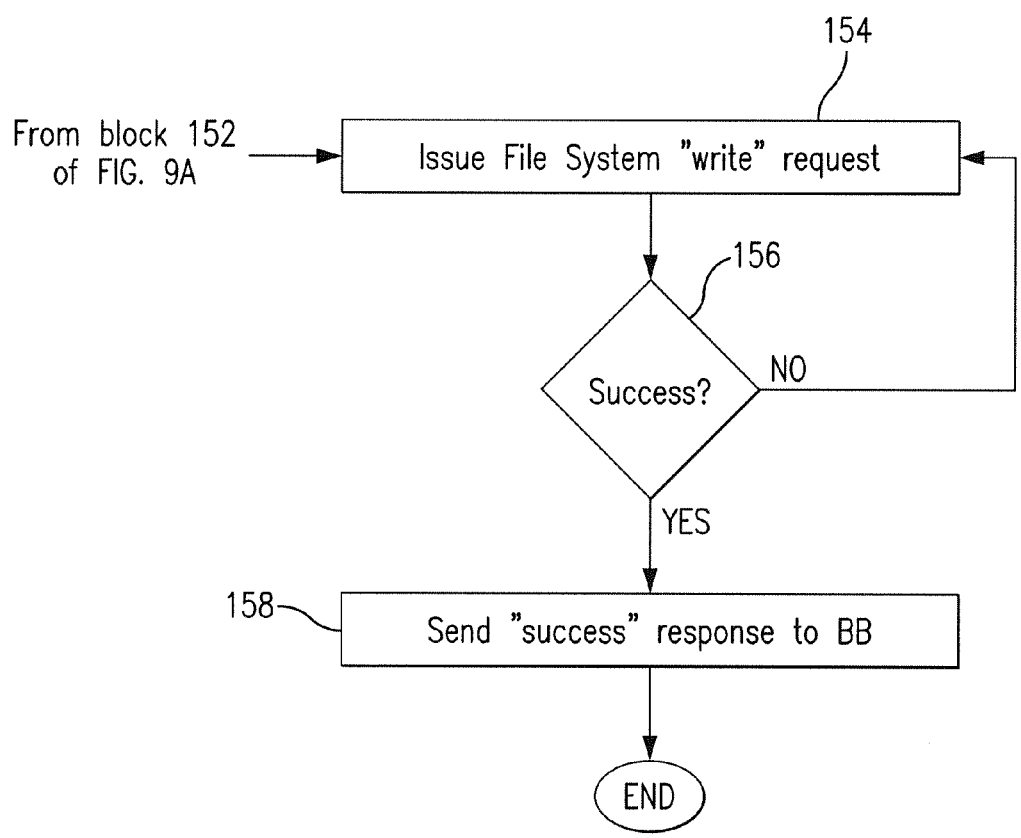

Referring to FIGS. 9A-9B, the "BBNA Host" Mode of operation refers to a process where the BBNA process requests various BB nodes to "pull" (or "push") the data to (or from) buffers allocated by the BBNA process. This mechanism is useful in cases where the data on the BB I/O nodes is stored on block devices rather than byte addressable memory. CPU intervention is required in this mode of operation when BBNA asks whether to read or write data from participating BB I/O nodes.

In this mechanism, upon receipt the compute nodes' "write" requests in step 140, the BB nodes store data fragments and distribute metadata in step 142.

In the subsequent step 144, the primary BB node gathers all the extent information required for a full data stripe. Upon collecting all the extent information, the primary BB node creates, (in step 144), a list of nodes/metadata for a full data stripe, and issues a command which is indicative of the node IDs where the data fragments reside, the buffer information where the data resides on each node, and the corresponding extent information required for File System I/O.

The primary BB node sends the command to the BBNA process in step 146. Upon receiving the command from the primary BB node, the BBNA process allocates a buffer sufficient to accommodate full data stripe, creates scatter gather lists for each participating BB I/O node based on the size of the data fragment that resides on each of them, and in block 148 sends "read" requests to the participating BB I/O nodes to transfer data fragments to the allocated buffer.

When the BB nodes receive the "read" requests from the BBNA process, they prepare local buffers and then issue a remote memory "write" request to transfer the data from their buffers to BBNA allocated buffer over the network.

In step 150, the BBNA process waits for responses from all BB node involved, and if in logic block 152 it is determined that not all BB nodes provided responses, the logic loops to block 148.

If, however, in logic block 152, it is determined that BBNA has received the confirmation indicating success or failure of data transfer from all participating BB nodes, the BBNA process issues (in step 154) the File System "write" request.

Upon completion of the "write" request by the File System, as determined in logic block 158, the BBNA process in step 158 notifies the primary BB node of the status of request.

If however in block 156, it is determined that the File System did not complete the "write" request, the logic returns to block 154. If, after a predetermined number of retries, the file system is not able to complete the BBNA's request, the BBNA sends "failure" response to the primary BBN node.

Figure 10:
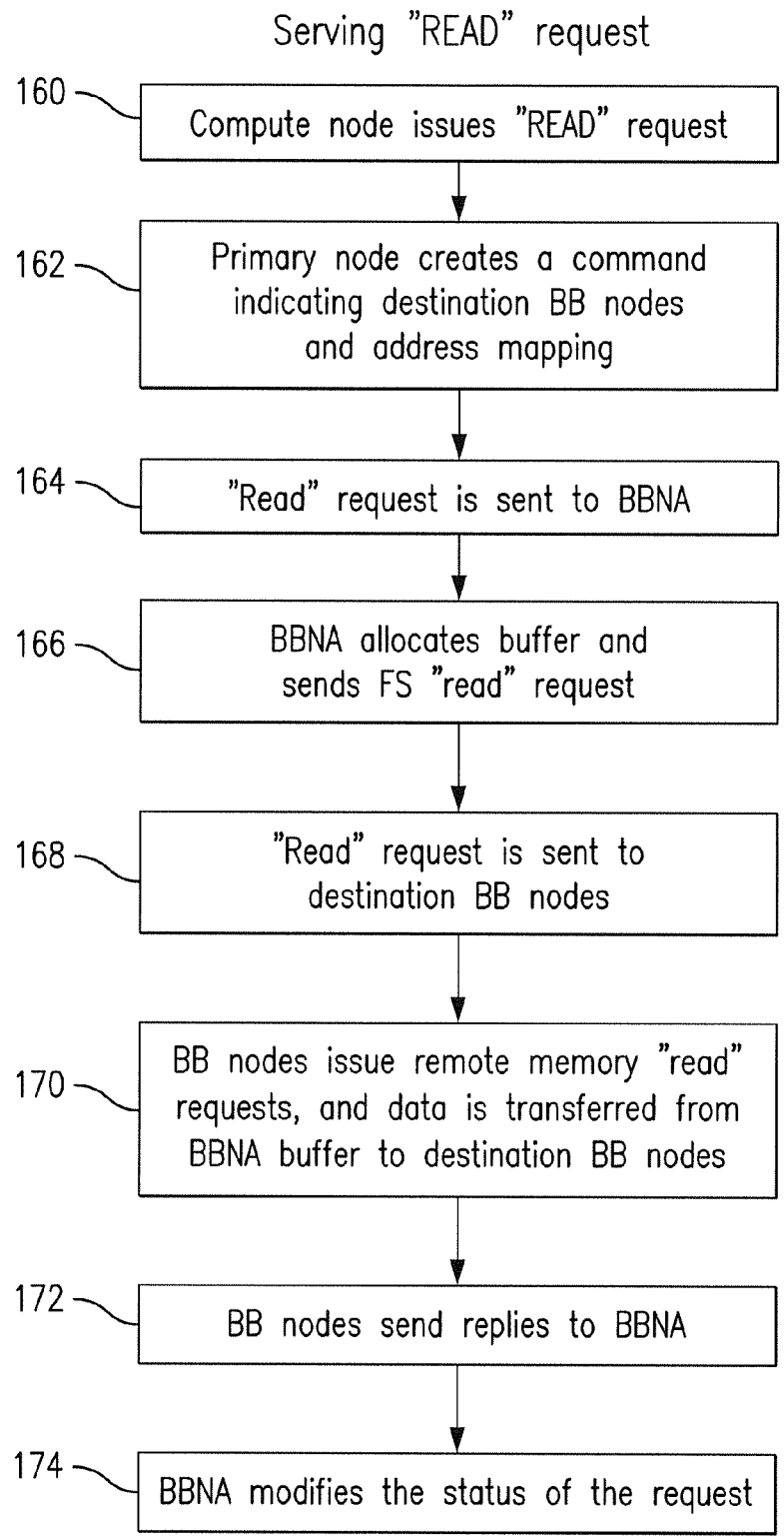
FIG. 10 is a flow chart diagram reflecting the operation of the subject system servicing a "read" request.

During servicing a "READ" request, as reflected by the flowchart diagram in FIG. 10, upon receiving of a "READ" request in step 160, the primary BB node in step 162 creates a command indicating the destination BB nodes for the read data, and in step 164 sends the request to the BBNA. The command indicating the destination BB node also contains the block device address mapping. Upon receiving the command, BBNA process allocates the buffer and in step 166 issues a File System "read" request.

Once the data buffers are ready with the read data residing in them, the BBNA process, in step 168, sends "read" requests to the destination BB nodes indicating to each of them the scatter/gather list from where the BB nodes are required to pull the data.

Subsequently, each destination node in step 170 issues a remote memory "read" request to transfer the data from BBNA allocated buffers to the BB nodes buffers which then can be written to block devices (if required).

Upon receipt of replies from the participating BB I/O nodes in step 172, the BBNA process, in the subsequent step 174, modifies the status of the "write" request to the primary BB I/O node.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A method for data migration between data generating entities and a File System, comprising:
   (a) operatively coupling a Burst Buffer (BB) tier between at least one data generating entity and a File System, and configuring said BB tier with a plurality of Burst Buffer (BB) nodes, each operating with data input speed exceeding the data input speed of said File System;
   (b) configuring said File System with at least one Burst Buffer Network Aggregator (BBNA) unit;
   (c) sending a first data write request from said at least one data generating entity to said BB tier, said first data write request including a plurality of data fragments related to a respective data stripe;
   (d) distributing said first data write request into said plurality of data fragments, and storing each of said plurality of data fragments and metadata associated therewith in a respective participating BB node from said plurality of BB nodes in said BB tier;
   (e) assigning a primary BB node from said participating BB nodes for servicing said first data write request;
   (f) gathering, by said primary BB node, metadata for said plurality of data fragments residing in said participating BB nodes, and generating a metadata list corresponding to said plurality of data fragments for said respective data stripe;
   (g) sending a command to coalesce said plurality of data fragments for said respective data stripe along with said metadata list from said primary BB node to said at least one BBNA unit;
   (h) subsequently, allocating, by said at least one BBNA unit, a full data stripe buffer sufficient to accommodate said first data write request;
   (i) transferring said plurality of data fragments from said participating BB nodes into said full data stripe buffer in accordance with said metadata list, thereby coalescing said plurality of data fragments of said data write request into a full said respective data stripe in said full data stripe buffer; and
   (j) transferring said full data stripe from said full data stripe buffer of said at least one BBNA unit into said File System.

2. The method of claim 1, further comprising:
   prior to said step (j), issuing a second data write request by said at least one BBNA unit to said File System.

3. The method of claim 1, further comprising:
   upon completion of said data transfer in said step (j), reporting, by said at least one BBNA unit to said primary BB node.

4. The method of claim 1, wherein each of said BB nodes allocates a byte addressable buffer, further comprising:
   servicing said first data write request in a BBNA Target Mode, and
   prior to said step (i), issuing a remote memory READ request by said at least one BBNA unit to read contents of said byte addressable buffer of each said BB node.

5. The method of claim 4, further comprising:
   prior to said step (i), signaling, by said primary BB node to said plurality of participating BB nodes, to move data fragments residing thereat to said byte addressable buffers.

6. The method of claim 5, further comprising:
   in said step (f), gathering scattered information about said byte addressable buffers by said primary BB node.

7. A method for data migration between data generating entities a File System, comprising:
   (a) operatively coupling a Burst Buffer (BB) tier between at least one data generating entity and a File System, and configuring said BB tier with a plurality of Burst Buffer (BB) nodes, each BB node being configured with a byte addressable buffer allocated therein, and each operating with data input speed exceeding the data input speed of said File System;
   (b) configuring said File System with at least one Burst Buffer Network Aggregator (BBNA) unit;
   (c) sending a first data write request from said at least one data generating entity to said BB tier;
   (d) distributing said data into data fragments, and storing each data fragment and metadata associated therewith in a respective participating BB node from said plurality of BB nodes in said BB tier;
   (e) assigning a primary BB node from said participating BB nodes for servicing said first data write request;
   (f) gathering, by said primary BB node, metadata for said data fragments residing in said participating BB nodes, and generating a metadata list;
   (g) sending a command along with said metadata list from said primary BB node to said at least one BBNA unit;
   (h) subsequently, allocating, by said at least one BBNA unit, a full data stripe buffer sufficient to accommodate said first data write request;
   (i) transferring said data fragments from said participating BB nodes into said full data stripe buffer in accordance with said metadata list, thereby coalescing said data fragments of said data write segment into a full data stripe in said fill data stripe buffer;
   (j) creating by said primary BB node, a command including BB nodes ID, buffer descriptor, address, size, and a RDMA (Remote Direct Memory Access) key on said byte addressable buffers, and
   (k) transferring said full data stripe from said full data stripe buffer of said at least one BBNA unit into said File System.

8. The method of claim 1, wherein said File System includes a plurality of File Servers, further comprising:
   in said step (b), configuring said at least one BBNA unit on at least one of said plurality of File Servers.

9. The method of claim 1, further comprising:
   operatively coupling at least one File System Input/Output node between said at least one data generating entity and said File System,
   dedicating said at least one File System Input/Output node for interaction with said File System, and
   in said step (b), configuring said at least one BBNA unit on said at least one File System Input/Output node.

10. The method of claim 1, further comprising:
    servicing said first data write request in a BBNA Host Mode,
    prior to said step (i), issuing a READ request by said at least one BBNA unit to said participating BB nodes, responsive to said READ request, pushing data fragments residing at said participating BB nodes to said full data stripe buffer allocated by said at least one BBNA unit.

11. A system for data migration between data generating entities and a File System, comprising:
a Burst Buffer (BB) tier operatively coupled between at least one data generating and the File System, wherein said Burst Buffer tier includes a plurality of BB nodes having data input speed exceeding the data input speed of said File System;
a plurality of File Servers operatively coupled to said BB tier; and
at least one Burst Buffer Network Aggregator (BBNA) unit configured at said File System in operative coupling to said plurality of BB nodes, wherein each of said BB nodes is configured with a byte addressable buffer, wherein said at least one BBNA unit is configured to read contents of said byte addressable buffer, and wherein said at least one BB node is configured to create a command including BB nodes ID and burst buffer descriptor, size, and a RDMA (Remote Direct Memory Access) key on said byte addressable buffer,
said at least one BBNA unit being configured to coalesce data fragments stored in participating BB nodes from said plurality thereof into a full data stripe under the direction of at least one of said participating BB nodes prior to transfer said full data stripe into said File System.

12. The system of claim 11, wherein said at least one BBNA unit resides on a respective one of said plurality of File Servers.

13. The system of claim 11, wherein said File System further comprises a plurality of File System Input/Output (FSIO) nodes operatively coupled to said plurality of data generating entities and dedicated for said File System interaction, wherein said at least one BBNA unit resides on a respective one of said plurality of FSIO nodes.

14. The system of claim 11, wherein each of said plurality of BB nodes is configured to store at least one data fragment of said full data stripe and metadata associated therewith,
wherein said at least one BB node is configured to gather said metadata from said plurality of participating BB nodes, and to generate a metadata list on data fragments residing in said participating BB nodes, and
wherein said at least one BBNA unit is configured to allocate a full data stripe buffer sufficient to store said full data stripe formed of said data fragments upon receipt of said metadata list from said at least one BB node, and to subsequently transfer said data fragments from said participating BB nodes to said full data stripe buffer prior to transferring said full data stripe to said File System.

15. The system of claim 14, further comprising an array of data storage units operatively coupled to said plurality of File Servers.

16. The system of claim 11, wherein, for servicing a READ request from at least one data generating entity, said at least one BBNA unit is configured to:
(a) allocate a buffer sufficient to accommodate said READ request;
(b) transfer said requested data from said File System to said buffer; and
(c) subsequently transfer said data from said buffer to at least one destination BB node indicated by said at least one BB node.

17. The system of claim 11, further comprising a High Speed Network intercoupled between said data generating entities and said BB tier.

18. The system of claim 11, further comprising a Storage Fabric intercoupled between said BB tier and said File System.

19. The system of claim 11, further comprising a plurality of I/O nodes between said data generating entities and said File System, wherein each of said plurality of I/O nodes is augmented with a respective Burst Buffer unit.

* * * * *